Patented Jan. 6, 1948

2,433,905

UNITED STATES PATENT OFFICE 2,433,905

METHOD FOR THE CRYSTALLIZATION OF ALBUMIN AND THE PREPARATION OF PROTEIN PRODUCTS THEREFROM

Walter L. Hughes, Jr., Boston, Mass., assignor to the United States of America, as represented by the Secretary of War No Drawing. Application November 1, 1943, Serial No. 508,636

8 Claims. (Cl. 260—122)

The present invention relates to the precipitation of proteins, and more specifically it is directed to improvements in methods for effecting crystallization of proteins and for the preparation of protein products.

A variety of useful proteins is contained, for example, in blood, some being found in the red blood cells and others in solution in the plasma or serum. Other useful proteins are also found in animal or vegetable tissues, in fluids such as milk, or in extracts such as liver extract, corn extract, cotton seed meal, etc.

Improved methods for the fractionation of proteins have been proposed by other investigators in this field. These methods involve, in general, the use of an organic precipitant such as methanol, ethanol, butanol, acetone, dioxane, etc., in combination with an electrolyte, the pH and temperature of the solution and the concentration of protein therein being suitably controlled. By the use of these procedures, various proteins, for example fibrinogen, globulins, albumin, etc., may be separated from their solutions and from each other, either singly or in selected combinations.

These proteins have many uses, including their use as foods, in the formation of certain plastics and in surgery and other therapeutic applications. Albumin, for instance, is of particular interest in the treatment of shock by intravenous injection of solutions of albumin obtained from blood. For this use a high degree of purity of the albumin is essential. Among various other applications, the procedures of the present invention are of great utility in the production of crystalline albumin.

One of the objects of this invention is therefore to provide improvements in methods for the crystallization of albumin and other proteins and also to provide novel and improved protein products.

It has been found that certain organic compounds, for example aliphatic alcohols and the corresponding aliphatic halides containing five or more carbon atoms, as well as some aromatic compounds such as benzene and toluene, when present in solutions of albumin, markedly accelerate the rate of crystal formation. In fact, in the case of human serum albumin, commercial crystallization has been produced by the present invention in solutions which otherwise showed no tendency to form crystals, even when seeded.

The compounds usable in this invention may be described as polar organic compounds which are chemically unreactive toward protein in solution and which are of low solubility (less than five per cent) in the protein solution. The term "chemically unreactive" is used to distinguish "chemically reactive" compounds which react with the protein to change its chemical or physicochemical properties. The higher aliphatic alcohols have been found to be very effective and their effectiveness seems to increase with increase in the length of the chain of carbon atoms, at least up to a certain point. Aliphatic alcohols containing five to ten carbon atoms have been found particularly suitable. The very long chain alcohols, such as stearyl or cetyl alcohol, however, show considerably less effect, probably because they are not sufficiently soluble in the protein solutions involved.

The protein solutions to which these compounds are added may contain an organic precipitant for protein, which precipitant is chemically unreactive toward protein in solution and is miscible with water, for example ethanol or other alcohol having not more than three carbon atoms.

The effect of solubility in the particular protein solution involved, on the effectiveness of the reagent, is illustrated by experiments on the crystallization of bovine albumin from solutions containing 15% to 25% ethanol. In these experiments it has been found that a lower alcohol (n-pentanol) was more effective at 15% ethanol, whereas a higher alcohol (n-decanol) was more effective at 25% ethanol. The indication is that decanol is not sufficiently soluble at 15% ethanol to be fully effective, whereas pentanol is too soluble at 25% ethanol to be fully effective. Where the reagent is too soluble, it apparently does not concentrate sufficiently in the protein-solvent interface to be fully effective.

The effectiveness of these reagents increases with the amount used up to the saturation point of the reagent in the protein solution being treated. About 0.1% of the volume of the solution is usually an effective amount. However, greater amounts, up to 5%, may be used and smaller amounts, even as little as 0.01% will usually have some effect. The amount used affects primarily the rate of crystallization and only secondarily affects the yield as this is affected by the rate.

Since proteins are very reactive substances, reagents should be selected which, as previously indicated, are chemically inert toward proteins in the solutions treated.

It has been further discovered that the amount of reagent used to promote crystallization may be considerably reduced if it is added in combination with an ether, for example ethyl ether. The ether alone does not assist crystallization.

Its effect in combination with the reagent of the invention is illustrated by the fact that the addition of 0.3% of ethyl ether in combination with 0.03% of decanol produced crystallization results comparable with those obtained by using 0.1% to 0.2% of decanol alone.

The reagent and the ether may conveniently be introduced into the protein solution dissolved in the ethanol or other organic precipitant added for final adjustment of the precipitation point.

Relatively few proteins have ever been crystallized, and nearly all of those crystallized are of a generally globular molecular shape and contain a relatively large number of ionic groups. It seems reasonable that both of these factors would encourage aggregation in a regular crystalline pattern. Thus, a knowledge of these properties of any protein which it is desired to crystallize will help one to predict his chances of success.

However, even among proteins of quite indistinguishable physical properties, as for example the serum albumins of different species, large differences in the ease of crystallization or in the optimal conditions for crystallization exist.

In crystallizing proteins, one should establish the optimum conditions with respect to the amount of alcohol or other precipitant present in the system, the salt concentration, the temperature, the pH and the protein concentration of the solution.

Certain general principles can be cited which will help in establishing these conditions.

Most proteins crystallize best near but not necessarily at their isoelectric point. Thus serum albumin crystallizes most readily at pH 5.5, which is slightly above its isoelectric point, it being found that the albumin will precipitate best, in accordance with the process of the present invention, within a pH range of the albumin solution of from pH 5.1 to pH 6.0.

Proteins crystallize best from strongly supersaturated solutions. Fortunately, the amorphous form of a protein precipitate is usually much more soluble than the crystalline form, so that the conditions may be so adjusted that practically complete crystallization will occur without the formation of amorphous precipitate. In fact, this leads to the best general principle in protein crystallization: a protein precipitant (either organic or inorganic) is added in amount just sufficient to precipitate the protein from its solution; then solvent (the same as that used in preparing the original solution) is carefully added until the precipitate just redissolves. This will result in a solution highly supersaturated with respect to the crystalline phase. Sometimes a solution obtained in this way and on the verge of precipitating amorphously is highly viscous. Since this will tend to inhibit crystallization it may be desirable to add a small additional amount of solvent.

The protein concentration may vary widely. This affects largely the yield and degree of purification obtained but only slightly the ability to crystallize. A useful concentration is from 5% to 15% protein. At higher concentrations the viscosity of the solution may become too great, and at lower concentrations the rate of crystallization becomes too slow.

For those proteins, such as serum albumin, which have a large temperature coefficient of solubility, this temperature variable may prove very useful. Varying the temperature provides an excellent way of gradually but uniformly decreasing the solubility of such a protein as crystallization proceeds, in order to obtain a better yield. It also provides a convenient way of correctly adjusting the amount of protein precipitant added. Thus, in the case of human serum albumin as illustrated below, just sufficient ethanol was added to precipitate the albumin amorphously at −5° C. Then the solution was allowed to stand a few degrees above this temperature to crystallize.

The temperature coefficient must always be used cautiously and with due regard for the denaturing effect of elevated temperatures on protein solutions. In order to obtain preparations of the highest stability, the temperature should always be kept as low as possible. Proteins frequently seem to crystallize more readily at higher temperatures, but this is probably due to the lower viscosity of the solution rather than to its denaturing action.

Probably the best procedure is to set up a series of samples with appropriate variations of pH, ionic strength, and kind and amount of precipitant at appropriate temperatures. To these samples are then added enough of one of the crystallization aids herein described (it is important to try several of these compounds) to saturate the solution. The samples are now allowed to stand for several weeks with occasional microscopic observation, to see if crystals are forming.

Once a protein has been crystallized, it is desirable to save some of the crystals for seeding subsequent preparations. The addition of a few seeds may shorten the time necessary for crystallization from weeks to days or even a few hours.

As a specific example of the practice of my process in the crystallization of human albumin, the following may be given:

A 25% albumin solution was used. The amount of acetic acid-sodium acetate buffer necessary to adjust the pH of the protein solution to 5.5 was determined by titration. The buffer used had a sodium acetate concentration of 0.8 mole per litre and a salt to acid ratio of 0.185. The pH was measured with a glass electrode at 25° C. on samples diluted with water to about 2% protein.

An ethanol-water buffer mixture equal in volume to the 25% albumin solution was then made up, containing 53.3% ethanol, with enough of the sodium acetate buffer to give a final pH of 5.5. This buffer mixture at −5° C. was then added through a capillary tube to the albumin solution. The rate of addition was about 50 cc. per minute and the temperature was held at 0° C. throughout. At the conclusion of the addition, the solution had developed a slight haze and this was removed by filtration through pads of calcined diatomaceous earth. In some cases, 7.5 grams of filter aid per litre of solution proved advantageous. The filter aid should be pyrogen free and washed with 25% ethanol before suspending it in the protein solution.

The amount of 95% ethanol necessary to adjust the temperature of the precipitation point to −5° C. was then determined. To the 95% ethanol was added sufficient n-decanol to bring the total final concentration to 0.2% decanol by volume.

The decanol-ethanol water mixture, cooled to −5° C. or below, was then added to the albumin solution at such a rate that the temperature did not rise above 0°. A few previously prepared normal human serum albumin crystals were added and the mixture was allowed to stand at —5° C. until crystallization was complete. The introduction of the seed crystals served simply as a means of hastening the initiation of crystallization.

The albumin solution was allowed to stand for 48 hours and the crystals were then removed by centrifugation at —5° C. 90% of the total protein may be separated in the centrifuged precipitate after the first crystallization.

A further specific example, illustrating the use of the invention in the crystallization of bovine albumin, is as follows:

To 1 kilogram (wet weight) of bovine albumin in the form of a paste containing 40% ethanol, at —5° C., one litre of 15% ethanol at —5° C. was slowly added with gentle mechanical stirring. During this step the temperature did not exceed —4° C. When a uniform suspension had been attained, sufficient 0.2 M NaHCO$_3$ solution, pre-cooled to 0° C., was added to bring the pH to 5.3. This should require about 100 cc. of 0.2 M NaHCO$_3$. (The pH was measured on a 1:10 dilution of the solution with water.)

The albumin was still only partially dissolved. To complete solution, small amounts of water, 100 cc. at a time, pre-cooled to 0° C., were added. Fifteen minutes were allowed between successive additions to permit equilibrium to be established. Undissolved albumin can be readily distinguished from small amounts of undissolved globulin because, as the last albumin dissolves, the appearance of the solution changes sharply from a milky white to a hazy gray-green color.

After standing twelve hours, the solution was filtered. This was accomplished by suspending in it 15 grams of washed filter aid, and then filtering this mixture on Buchner funnels which had been pre-coated with a filter aid. The still hazy filtrate may require two or more complete passages through filter aid cakes to attain the desired clarity.

To crystallize the final filtrate there are added, with careful stirring, 25 cc. of a solution containing 10% decanol and 60% ethanol, pre-cooled to —10° C., and the resulting solution was seeded with the needle type of crystal.

After allowing two to four days for crystallization to become complete, the crystals were centrifuged.

For some uses, such as human injection, where a high degree of purity is essential, the albumin crystals may be redissolved and recrystallized repeatedly, if necessary, until a product of the desired purity is obtained.

The final crystals were suspended in one-half their weight of 0.005 M sodium chloride and then dried from the frozen state.

The protein product obtained as albumin crystals may contain the polar organic compounds used to promote crystallization.

Human albumin crystals are obtained in the form of hexagonal plates, while bovine albumin crystals are obtained in the form of needles.

By the method of this invention, it is possible to prepare purer and more stable preparations of serum albumin than was heretofore possible. The invention has many applications in the purification of other proteins. When crystallization is possible, a protein can usually be obtained in a much greater degree of purity, since the tendency for co-precipitation of the impurities is markedly less than is found in amorphous precipitation. As in the case of serum albumin here cited, new degrees of purity frequently lead to new uses for protein products, particularly in the field of biologicals.

Having thus described the invention, what is claimed as new and desired to secure by Letters Patent is:

1. The method of crystallizing albumin which comprises adding to a solution which contains albumin in amount between 50 and 150 grams per litre of solution, ethanol in amount sufficient to constitute 25% of said solution by volume, adjusting the salt concentration of said solution to approximately 0.1 molar, the pH within the range of 5.1 to 6.0 and the temperature to 0° C. or lower, adding decanol to said solution in amount between 0.01 and 5% by volume, and crystallizing albumin from the resulting solution.

2. In a method for the precipitation of albumin, the step which comprises promoting crystallization of the albumin from an aqueous solution containing from approximately 5 per cent to approximately 15 per cent of the albumin, and an albumin precipitant, by adding to the said solution an aliphatic monohydric alcohol of from 5 to 10 carbon atoms in amount of from 0.01 to 5 percent by volume, the albumin precipitant being present in amounts effecting precipitation of the albumin in the presence of the added aliphatic monohydric alcohol, and the albumin solution having a pH value of from pH 5.1 to pH 6.0.

3. In a method for the precipitation of albumin, the step which comprises promoting crystallization of albumin from an aqueous solution thereof containing from substantially 5 to substantially 15 per cent of the albumin, and an albumin precipitant, the said solution having a pH value within the range of substantially pH 5.1 to pH 6.0, by adding decanol to the said solution in an amount of from 0.01 percent to 5.0 per cent by volume, the albumin precipitant being present in effective amounts for precipitating the albumin in the presence of the decanol.

4. In a method for the precipitation of albumin, the step which comprises promoting crystallization of albumin from an aqueous solution containing from 5 to 15 per cent of the albumin, the albumin solution having a pH value of from substantially pH 5.1 to pH 6.0, and an alcohol having from 1 to 3 carbon atoms, by adding ether and from 0.01 percent to 0.1 percent by volume of decanol to the said solution, the alcohol of from 1 to 3 carbon atoms being present in amounts effecting the precipitation of the albumin in the presence of the decanol.

5. In a method for promoting the crystallization of albumin from an aqueous solution containing from 5 to 15 per cent albumin, the step which comprises adding an aliphatic monohydric alcohol of from 5 to 10 carbon atoms in an amount of 0.01 to 5 percent by volume to a substantially saturated aqueous solution of albumin containing an albumin precipitant, the said albumin solution having a pH value of from substantially pH 5.1 to pH 6.0, the albumin precipitant being present in amount effective to precipitate the albumin in the presence of the aliphatic monohydric alcohol.

6. In a method for promotion of the crystallization of albumin from a 5 to 15 per cent aqueous solution of the said albumin and an alcohol of from 1 to 3 carbon atoms, the step which comprises adding decanol to the said solution in an amount of from 0.01 to 5.0 per cent by volume, the said albumin solution having a pH value within the range of substantially pH 5.1 to pH 6.0, the alcohol of from 1 to 3 carbon atoms being present in amount effecting precipitation of the albumin in the presence of the decanol.

7. In a method for promoting the crystallization of human albumin from a 5 to 15 per cent aqueous solution of the said albumin, and ethanol, the step which comprises adding to the said solution approximately 0.03 per cent by volume of decanol and approximately 0.3 per cent by volume of ethyl ether, the albumin solution having a pH value between the limits of from substantially pH 5.1 to pH 6.0, the ethanol being present in amount effecting the precipitation of the albumin in the presence of the decanol.

8. In a method for the precipitation of albumin, the step which comprises promoting crystallization of an albumin from an aqueous solution containing from approximately 5 to 15 per cent of the albumin and approximately 25 per cent by volume of an aliphatic monohydric alcohol of from 1 to 3 carbon atoms, the said albumin solution having a pH value within the range of substantially pH 5.1 to 6.0, by adding from substantially 0.01 to 0.1 per cent by volume of decanol and substantially 0.3 per cent by volume of ethyl ether to the said solution.

WALTER L. HUGHES, JR.

REFERENCES CITED

The following references are of record in the file of this patent:

Liu et al., Fractional Precipitation of Serum Proteins with Methyl Alcohol, from Chinese Journal of Physiology, 1934, vol. III, No. 2, pp. 97–109.

Cohn, Chemical Reviews, vol. 28 (1941), pp. 395–417.

Cohn et al., Preparation and Properties of Serum and Plasma Proteins III, Journ. Am. Chem. Soc., vol. 62 (1940), pp. 3396–3400.